United States Patent
Woodington et al.

(10) Patent No.: US 7,400,290 B2
(45) Date of Patent: Jul. 15, 2008

(54) VEHICLE RADAR SYSTEM HAVING MULTIPLE OPERATING MODES

(75) Inventors: Walter Gordon Woodington, Lincoln, MA (US); Dennis Hunt, Westford, MA (US)

(73) Assignee: Valeo Raytheon Systems, Inc., Hudson, NH (US)

( * ) Notice: Subject to any disclaimer, the term of this patent is extended or adjusted under 35 U.S.C. 154(b) by 212 days.

(21) Appl. No.: 11/324,035

(22) Filed: Dec. 30, 2005

(65) Prior Publication Data

US 2007/0152870 A1    Jul. 5, 2007

(51) Int. Cl.
G01S 13/92    (2006.01)
G01S 13/58    (2006.01)

(52) U.S. Cl. ............... 342/84; 342/70; 342/174; 342/107

(58) Field of Classification Search .............. 342/84
See application file for complete search history.

(56) References Cited

U.S. PATENT DOCUMENTS

| | | | |
|---|---|---|---|
| 2,540,839 | A | 2/1951 | Southworth |
| 4,286,236 | A | 8/1981 | Ficher |
| 5,194,823 | A | 3/1993 | Wendt et al. |
| 5,592,178 | A | 1/1997 | Chang et al. |
| 5,652,589 | A * | 7/1997 | Ono et al. ............. 342/70 |
| 5,694,130 | A * | 12/1997 | Suzuki et al. .......... 342/70 |
| 5,708,433 | A | 1/1998 | Craven |
| 5,727,023 | A | 3/1998 | Dent |
| 6,039,580 | A | 3/2000 | Sciarretta et al. |
| 6,167,286 | A | 12/2000 | Ward et al. |
| 6,198,449 | B1 | 3/2001 | Muhlhauser et al. |
| 6,218,987 | B1 | 4/2001 | Derneryd et al. |
| 6,324,755 | B1 | 12/2001 | Borkowski et al. |
| 6,463,303 | B1 | 10/2002 | Zhao |
| 6,489,927 | B2 | 12/2002 | LeBlanc et al. |
| 6,492,949 | B1 | 12/2002 | Breglia et al. |
| 6,501,415 | B1 | 12/2002 | Viana et al. |
| 6,577,269 | B2 | 6/2003 | Woodington et al. |
| 6,577,879 | B1 | 6/2003 | Hagerman et al. |
| 6,642,908 | B2 | 11/2003 | Pleva et al. |

(Continued)

FOREIGN PATENT DOCUMENTS

WO    WO 2004/044610 A1    5/2004

OTHER PUBLICATIONS

Cheng; "A Fast Hybrid MoM/FEM Technique for Microstripline Vertical Couplers With Multiple Identical Cavaties;" IEEE Jun. 2003; 0-7803-7846; pp. 1076-1079.

(Continued)

*Primary Examiner*—Thomas G. Black
*Assistant Examiner*—Shelley Chen
(74) *Attorney, Agent, or Firm*—Daly, Crowley, Mofford & Durkee, LLP

(57) ABSTRACT

A vehicle radar system includes a processing system which operates in one of a plurality of operating modes which are selected based upon an environment (or changes to an environment) surrounding the vehicle radar system. In one exemplary embodiment, the vehicle radar system is provided as a vehicle radar system which operates in one of: a highway traffic mode and a city traffic mode depending upon whether a vehicle in which the vehicle radar system is disposed is traveling along a highway or through a city.

13 Claims, 10 Drawing Sheets

U.S. PATENT DOCUMENTS

| | | | |
|---|---|---|---|
| 6,683,557 | B2 | 1/2004 | Pleva et al. |
| 6,738,017 | B2 | 5/2004 | Jacomb-Hood |
| 6,784,838 | B2 | 8/2004 | Howell |
| 6,821,003 | B2 * | 11/2004 | Baker et al. .................. 362/464 |
| 6,864,699 | B2 | 3/2005 | Sakayori et al. |
| 6,933,900 | B2 | 8/2005 | Kitamori et al. |
| 6,995,730 | B2 | 2/2006 | Pleva et al. |
| 7,038,608 | B1 | 5/2006 | Gilbert |
| 7,109,915 | B2 * | 9/2006 | Kurodai et al. ................. 342/82 |
| 2004/0012973 | A1 * | 1/2004 | Baker et al. .................. 362/464 |
| 2004/0027305 | A1 | 2/2004 | Pleva et al. |
| 2004/0164892 | A1 | 8/2004 | Shinoda et al. |
| 2004/0196173 | A1 * | 10/2004 | Kuroda et al. ................. 342/82 |
| 2004/0208249 | A1 | 10/2004 | Risbo et al. |
| 2005/0200514 | A1 * | 9/2005 | Peterson ...................... 342/20 |
| 2006/0125682 | A1 | 6/2006 | Kelly, Jr. et al. |
| 2006/0152406 | A1 | 7/2006 | Leblanc et al. |
| 2006/0187112 | A1 * | 8/2006 | Nalezinski et al. .......... 342/118 |
| 2007/0152870 | A1 * | 7/2007 | Woodington et al. .......... 342/70 |

OTHER PUBLICATIONS

Gao et al.: "Adaptive Linearization Schemes for Weakly Nonlinear Systems Using Adaptive Linear and Nonlinear FIR Filters;" Dept. of Electrical Engineering, University of Toronto; IEEE; Jan. 1991: CH2819-1/90/0000-0009; pp. 9-12.

Lin et al.; "A High Speed Low-Noise Equalization Technique with Improved Bit Error Rate;" EEE; Jul. 2002; 0-7803-7448; pp. 564-567.

Lohinetong et al.; "Microstrip To Surface Mounted Foam-Based Waveguide Transition For Ka-Band Filter Integration;" IEEE Jun. 2004; 0-7803-8401; pp. 899-902.

Mueller; "SMD-Type 42 GHz Waveguide Filter;" IEEE Jan. 2003; 0-7603-7695; pp. 1089-1092.

Nordsjo; "An Algorithm for Adaptive Predisortion of Certain Time-Varying Nonlinear High-Power Amplifiers;" 2002 The Institution of Electrical Engineers; XP-002364938; pp. 469-473.

EP Search Report and Written Opinion of the European Patent Office for EP 05 11 1991.5;dated Mar. 2, 2006.

EP Search Report and Written Opinion of the European Patent Office for EP 05 11 1994.9 dated Mar. 31, 2006.

EP Report and Written Opinion of the European Patent Office for EP 05 111 983.2 dated Apr. 7, 2006.

Pleva, et al.; "Beam Architecture For Improving Angular Resolution"; U.S. Appl. No. 11/026,506, filed on Dec. 30, 2004.

Pleva, et al.; "Waveguide—Printed Wiring Board (PWB) Interconnection"; U.S. Appl. No. 11/027,523, filed on Dec. 30, 2004.

Lohmeier et al.; "System And Method For Generating A Radar Detection Threshold;" U.S. Appl. No. 11/322,684, filed Dec. 30, 2005.

Lohmeier et al.; "System And Method For Verifying A Radar Detection;" U.S. Appl. No. 11/324,073, filed on Dec. 30, 2005.

Lohmeier et al.; "Method And System For Generating A Target Alert;" U.S. Appl. No. 11/322,869, filed on Dec. 30, 2005.

Woodington, et al.; "Detecting Signal Interference In A Vehicle System;" U.S. Appl. No. 11/427,829, filed on Jun. 30, 2006.

Hunt; "Generating Event Signals In A Radar System;" U.S. Appl. No. 11/323,960, filed on Dec. 30, 2005.

Gilbert; "Multi-Stage Finite Impulse Response Filter Processing"; U.S. Appl. No. 11/323,459, filed on Dec. 30, 2005.

Woodington; "Reducing Undesirable Coupling Of Signal(s) Between Two Or More Signal Paths In A Radar System"; U.S. Appl. No. 11/323,982, filed on Dec. 30, 2005.

Woodington; "Reducing Undesirable Coupling Of Signal(s) Between Two Or More Signal Paths In A Radar System"; U.S. Appl. No. 11/322,664, filed on Dec. 30, 2005.

* cited by examiner

VEHICLE RADAR SYSTEM HAVING MULTIPLE OPERATING MODES

CROSS-REFERENCE WITH OTHER PATENT APPLICATIONS

This patent application includes aspects from the following patent applications, which are all incorporated herein by reference in their entirety: application Ser. No. 11/323,960, filed Dec. 30, 2005 and entitled "GENERATING EVENT SIGNALS IN A RADAR SYSTEM"; application Ser. No. 11/323,459, filed Dec. 30, 2005 and entitled "MULTI-STAGE FINITE IMPULSE RESPONSE FILTER PROCESSING"; application Ser. No. 11/323,458, filed Dec. 30, 2005 and entitled "MULTICHANNEL PROCESSING OF SIGNALS IN A RADAR SYSTEM"; application Ser. No. 11/324,035, filed Dec. 30, 2005 and entitled "REDUCING UNDESIRABLE COUPLING OF SIGNAL(S) BETWEEN TWO OR MORE SIGNAL PATHS IN A RADAR SYSTEM"; application Ser. No. 11/323,982, filed Dec. 30, 2005 and entitled "REDUCING UNDESIRABLE COUPLING OF SIGNAL(S) BETWEEN TWO OR MORE SIGNAL PATHS IN A RADAR SYSTEM"; and application Ser. No. 11/322,684, filed Dec. 30, 2005 and entitled "SYSTEM AND METHOD FOR GENERATING A RADAR DETECTION THRESHOLD".

TECHNICAL FIELD

The invention relates to radar systems, and more particularly, to generating transmitter and receiver control signals in a radar system.

BACKGROUND

Radar systems have been developed for various applications associated with a variety of different types of vehicles, including but not limited to automobiles, trucks and boats. A radar system mounted on a vehicle detects the presence of objects, including other vehicles, in proximity to the vehicle. Such a vehicle radar system may be used in conjunction with a braking system of the vehicle to assist in active collision avoidance or in conjunction with a cruise control system of the vehicle to provide intelligent speed and traffic spacing control. In a further application, the vehicle radar system may be used to provide to a driver of the vehicle an indication of obstacles in or proximate a path of the vehicle.

SUMMARY OF THE INVENTION

In accordance with the present invention, a vehicle radar system includes a processing system which operates in one of a plurality of operating modes which are selected based upon an environment (or changes to an environment) surrounding the vehicle radar system. With this particular arrangement, a vehicle radar system which utilizes an operating mode most-suited for the environment in which the vehicle radar system operates is provided. In one embodiment, the vehicle radar system utilizes a chirp radar and a chirp waveform is adjusted to implement a plurality of different operating modes including but not limited to a highway operating mode and a city operating mode. Thus, in response to changes in the environment surrounding the vehicle radar system, the operating mode of the vehicle radar system can be dynamically changed by changing the radar chirp. The changes in the environment can be automatically detected by the vehicle radar system itself or a user of the system can manually set the operating mode of the vehicle radar system. It should be appreciated that although the adjustability of the chirp waveform is described herein as one exemplary way to change the operating mode of a vehicle radar system, the adjustability of the chirp waveform may be used in any type of radar system (i.e., a radar system other than a vehicle radar system) which utilizes chirp signals or the adjustability of the chirp waveform may be used in any type of detection system (i.e., a system other than a radar system) which utilizes chirp signals. Also, it should be understood that in other embodiments it may be possible, or even desirable, to change an operating mode of a detection system (a radar system or otherwise) by adjusting or changing other characteristics of the radar system in addition to or even in place of the chirp waveform. Thus, adjustments of a plurality of different detection parameters can be made to dynamically adjust an operating mode of a detection system in response to an environment in which the detection system is being used.

In accordance with a further aspect of the present invention, a method of operating a vehicle radar system includes detecting an environment in which the vehicle radar system is disposed and selecting a mode of operation for the vehicle detection system based upon the detected environment. With this particular arrangement, a technique for dynamically changing an operating mode of a vehicle radar system is provided. In one embodiment, the vehicle radar system determines whether a vehicle in which the detection system is disposed is traveling along an open highway or along a traffic filled city road. If the vehicle is traveling along an open highway, then the vehicle radar system operates in a first operating mode. On the other hand, if the vehicle in which the vehicle radar system is disposed is traveling along a city rode, then the vehicle radar system operates in a second operating mode.

DETAILED DESCRIPTION

Figure 1:
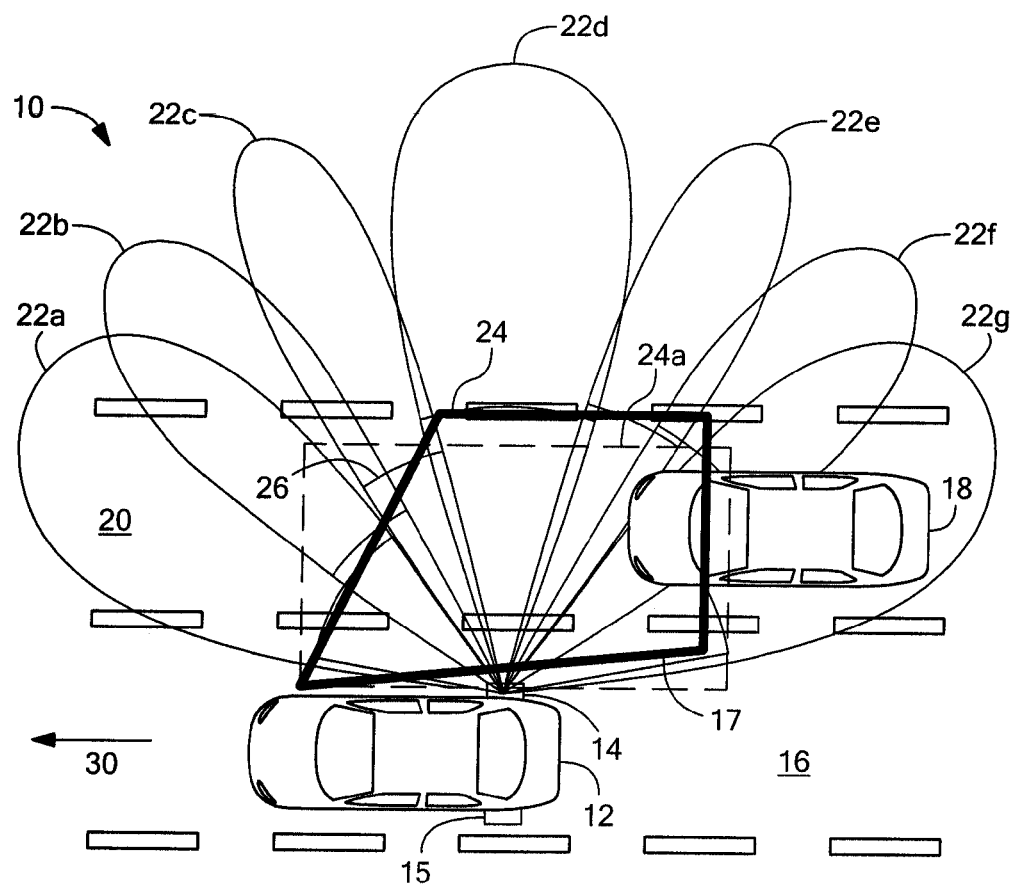
FIG. 1 is a diagrammatic view of a pair of vehicles traveling along a roadway.

Described herein is a novel approach for adjusting an operating mode of a vehicle detection system based upon an environment (or changes to an environment) the surrounding the detection system. For example, in the case where the detection system determines that a vehicle in which the detection system is disposed is traveling along a highway, then the detection system operates in a first operating mode. On the other hand, if the vehicle in which the detection system is disposed is traveling along a city rode, then the detection system operates in a second operating mode.

Reference is made herein to a detection system which utilizes radar and which has a particular type of system architecture and that reference is also made herein to one particular technique for changing an operating mode of such a detection system. It should be understood, of course, that such specific references are made only to facilitate an understanding of the concepts being described. Those of ordinary skill in the art should appreciate that the concepts described herein apply equally well to all types of vehicle detection systems regardless of the particular technology used to implement the detection system.

For example, in the case where the detection system is a vehicle radar system, a chirp waveform used for a highway environment may be adjusted when the environment changes to a city environment. That is, the operating mode of the vehicle radar system can dynamically change based upon changes in the environment surrounding the vehicle detection system. The changes in the environment can be automatically detected by the detection system itself or a user of the system can manually set the operating mode of the detection system. It should be appreciated that although the adjustability of the chirp waveform is described herein as a way to change the operating mode of vehicle radar detection system, the adjustability of the chirp waveform may be used in any type of detection system which utilizes chirp signals.

It should also be appreciated, that in other embodiments it may be possible, or even desirable, to change an operating mode of a detection system by adjusting or changing other characteristics of the detection system in addition to or even in place of the chirp waveform. Thus, adjustments of a plurality of different detection parameters can be made to dynamically adjust an operating mode of a detection system in response to an environment in which the detection system is being used.

Before proceeding with a discussion of exemplary embodiments as illustrated in the figures, it should be appreciated that reference is sometimes made herein to an event generator supplying voltage signals to control a signal source specified to be a voltage controlled oscillator (VCO). Those of ordinary skill in the art should appreciate that the concepts described herein apply to the control of any type of controllable signal source. It should also be appreciated that the event generator described herein can be adapted to supply signals to control any type of controllable signal source. For example, if the signal source were a current controlled signal source, then the event generator would provide current signals. It should thus be understood that the event generator can be adapted to provide any type of signal, including but not limited to analog or digital signals, having any signal characteristics necessary to appropriately control one or more of different types of signal sources.

Referring to FIG. 1, a first vehicle 12 traveling in a first traffic lane 16 of a road includes a side-object detection (SOD) system 14. The SOD system 14 is disposed on a side portion of the vehicle 12 and in particular, the SOD system 14 is disposed on a right rear quarter of the vehicle 14. The vehicle 12 also includes a second SOD system 15 disposed on a side portion of a left rear quarter of the vehicle 12. The SOD systems 14, 15 may be coupled to the vehicle 12 in a variety of ways. In some embodiments, the SOD systems may be coupled to the vehicle 12 as described in U.S. Pat. No. 6,489,927, issued Dec. 3, 2002, which is incorporated herein by reference in its entirety. A second vehicle 18 travels in a second traffic lane 20 adjacent the first traffic lane 16. The first and second vehicles 12, 18 are both traveling in a direction 30 and in the respective first and second traffic lanes 16, 20.

The second vehicle 18 may be traveling slower than, faster than, or at the same speed, or in the opposite direction as the first vehicle 12. With the relative position of the vehicles 12, 18 shown in FIG. 1, the second vehicle 18 is positioned in a "blind spot" of the first vehicle 12. The blind spot is an area located on a side of the first vehicle 12 whereby an operator of the first vehicle 12 may be unable to see the second vehicle 18 either through side-view mirrors 84, 86 (see FIG. 2) or a rear-view mirror (not shown) of the first vehicle 12.

The SOD system 14 generates multiple receive beams (e.g., a receive beam 22a, a receive beam 22b, a receive beam 22c, a receive beam 22d, a receive beam 22e, a receive beam 22f and a receive beam 22g) and an associated detection zone 24. The detection zone 24 is formed by the SOD system 14 by way of maximum detection ranges associated with each one of the receive beams 22a-22g, for example, the maximum detection range 26 associated with the receive beam 22c. The detection ranges may be adjusted to form any shape detection zone, for example, a rectangular detection zone 24a may be formed. Each of the receive beams 22a-22g may also have a minimum detection range (not shown), forming an edge 17 of the detection zone 24 closest to the first vehicle. Depending on implementation and purpose, the multiple receive beams may be of similar or different antenna patterns and of similar or different field of views. For example, but not limited to this, one receive beam may be broad such that its field of view encompasses the field of view of one or more or all of the other remaining receive beams.

In one particular embodiment, the SOD system 14 is a frequency modulated continuous wave (FMCW) radar, which transmits continuous wave chirp radar signals, and which processes received radar signals accordingly. In some embodiments, the SOD system 14 may be of a type described, for example, in U.S. Pat. No. 6,577,269, issued Jun. 10, 2003; U.S. Pat. No. 6,683,557, issued Jan. 27, 2004; U.S. Pat. No. 6,642,908, issued Nov. 4, 2003; U.S. Pat. No. 6,501,415, issued Dec. 31, 2002; and U.S. Pat. No. 6,492,949, issued Dec. 10, 2002, which are all incorporated herein by reference in their entirety.

In operation, the SOD system 14 transmits an RF signal having portions which impinge upon and are reflected from the second vehicle 18. The reflected signals (also referred to as "echo" signals) are received in one or more of the receive beams 22a-22g. Other ones of the radar beams 22a-22g, which do not receive the echo signal from the second vehicle 18, receive and/or generate other radar signals, for example, noise signals. As used herein, the term "noise signal" is used to describe a signal comprised of one or more of a thermal noise signal, a quantization noise signal, a crosstalk signal (also referred to as leakage or feed through signal), and an ambient RF noise signal.

In some embodiments, the SOD system 14 may transmit RF energy in a single broad transmit beam (not shown). In other embodiments, the SOD system 14 may transmit RF energy in multiple transmit beams (not shown), for example, in seven transmit beams associated with the receive beams 22a-22g.

In operation, the SOD system 14 may process the received radar signals associated with each one of the receive beams 22a-22g in sequence, in parallel, or in any other time sequence. The SOD system 14 may be adapted to identify an echo radar signal associated with the second vehicle 18 when any portion of the second vehicle 18 is within the detection zone 24. Therefore, the SOD system 14 is adapted to detect the second vehicle 18 when at least a portion of the second vehicle is in the field of view of the radar sensors on the first vehicle 12.

Figure 2:
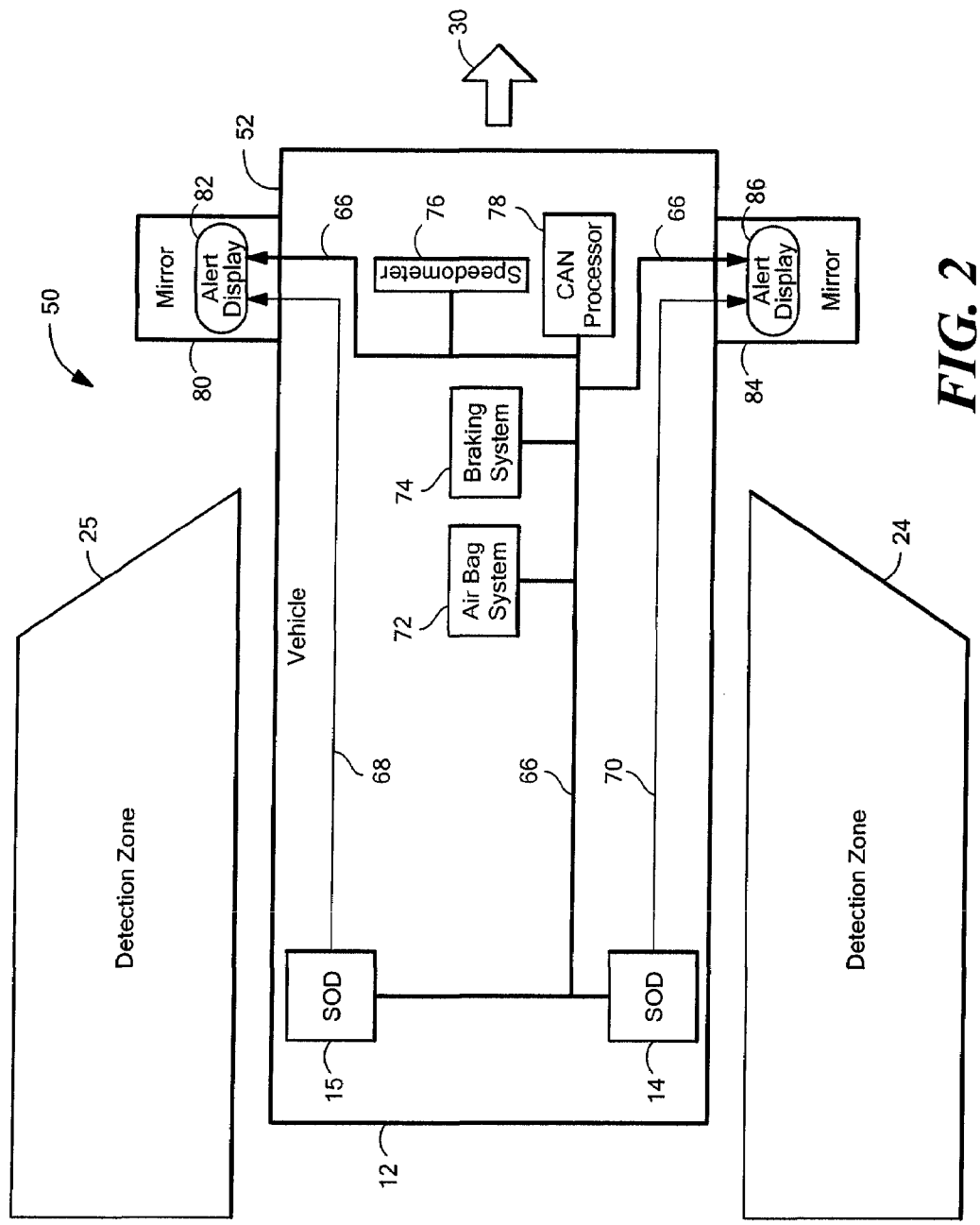
FIG. 2 is a block diagram of a vehicle system architecture.

Referring to FIG. 2, an exemplary vehicle system 50 which may be the same as or similar to the vehicle systems included in vehicles 12, 18 described above in conjunction with FIG. 1, includes vehicle systems such as SOD systems 14, 15, an air bag system 72, a braking system 74 and a speedometer 76.

Each one of the SOD systems 14, 15 is coupled to a Controller Area Network (CAN) processor 78 through a CAN bus 66. As used herein, the term "controller area network" is used to describe a control bus and associated control processor typically found in vehicles. For example, the CAN bus and associated CAN processor may control a variety of different vehicle functions such as anti-lock brake functions, air bags functions and certain display functions (visual, acoustic, or mechanical (haptic devices)).

The vehicle 12 includes two side-view mirrors 80, 84, each having an alert display 82, 86, respectively, viewable therein. Each one of the alert displays 82, 86 is adapted to provide a visual alert to an operator of a vehicle in which system 50 is disposed (e.g., the vehicle 12 in FIG. 1) to indicate the presence of another vehicle in a blind spot of the vehicle). To this end, in operation, the SOD system 14 forms detection zone 24 and SOD system 15 forms a detection zone 25.

Upon detection of an object (e.g., another vehicle) and satisfying alerting criteria applied to the static position and dynamic motion of the object with respect to the detection zone 24, the SOD system 14 sends an alert signal indicating the presence of an object to either or both of the alert displays 82, 84 through the CAN bus 66. In response to receiving the alert signal, the displays provide an indicator (e.g., a visual, audio, or mechanical indicator) which indicates the presence of an object. Similarly, upon detection of an object and satisfying alerting criteria applied to the static position and dynamic motion of the object with respect to the detection zone 25, SOD system 15 sends an alert signal indicating the presence of another vehicle to one or both of alert displays 82, 86 through the CAN bus 66. However, in an alternate embodiment, the SOD system 14 may communicate the alert signal to the alert display 82 through a human/machine interface (HMI) bus 68. Similarly, SOD system 15 may communicate the alert signal to the other alert display 86 through another human/machine interface (HMI) bus 70.

Figure 3:
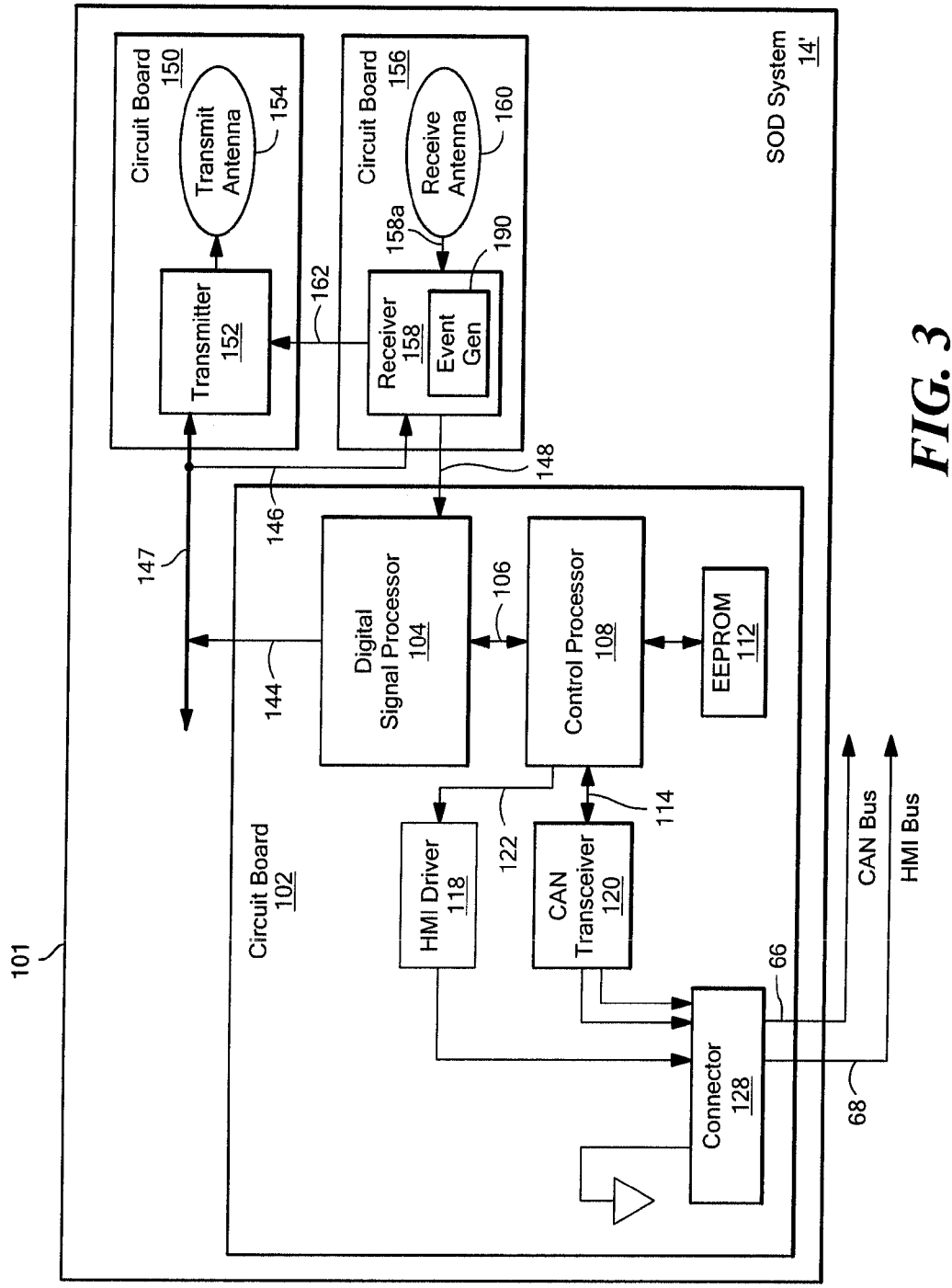
FIG. 3 is a block diagram of a vehicle radar system.

Referring to FIG. 3, a SOD system 14' which may be the same as or similar to SOD 14 described above in conjunction with FIGS. 1 and 2, includes a housing 101 having a plurality of circuit boards 102, 150, 156 disposed therein. The particular type of material from which each circuit board is provided can be selected to satisfy all circuit and cost requirements. For example, circuit board 102 may be provided as a fiberglass circuit board; and circuit board 150 may be provided as a low temperature co-fired ceramic (LTTC) circuit board or as a polytetrafluoroethylene (PTFE) circuit board 150; and circuit board 156 may be provided as an LTCC circuit board 156. Other materials, may of course, also be used. Those of ordinary skill in the art will understand how to select a particular material for each circuit board depending upon a variety of factors including but not limited to technical (i.e., engineering) requirements and cost.

The circuit board 102 has disposed thereon a digital signal processor (DSP) 104 coupled to a control processor 108. In general, the DSP 104 is adapted to perform signal processing functions, for example, fast Fourier transforms on signals provided thereto from the receiver. In some embodiments, the DSP 104 may be of a type described, for example, in U.S. patent application Ser. No. 11/102,352, filed Apr. 8, 2005 which is incorporated herein by reference in its entirety. The control processor 108 is adapted to perform digital functions, for example, to identify conditions under which an operator of a vehicle on which the SOD system 14 is mounted should be alerted to the presence of another object such as a vehicle in a blind spot.

The control processor 108 is coupled to an electrically erasable read-only memory (EEPROM) 112 adapted to retain a variety of values including but not limited to calibration values. Other read only memories associated with processor program memory are not shown for clarity. The control processor 108 is coupled to a CAN transceiver 120, which is adapted to communicate, via a connector 128, on the CAN bus 66.

The control processor 108 is coupled to an optional human/machine interface (HMI) driver 118, which may communicate via the connector 128 to the HMI bus 68. The HMI bus 68 may include any form of communication media and communication format, including, but not limited to, a fiber optic media with an Ethernet format, and a wire media with a two state format.

The circuit board 150 includes a radar transmitter 152, which is coupled to the DSP 104 through a serial port interface (SPI) 147 and a bus 144, and a transmit antenna 154, which is coupled to the radar transmitter 154.

The circuit board 156 includes a receiver 158, which is coupled to the DSP 104 through the SPI 147 and a bus 146, and a receive antenna 160, which is coupled to the radar receiver 158. The radar transmitter 152 and the radar receiver 158 may receive the regulated voltages from the voltage regulator 134. The receiver 158 also provides RF signals to the transmitter 152 through a bus 162.

In operation, the DSP 104 initiates one or more chirp control signals (also referred to as ramp signals) by providing a command signal to an event generator 190. In response to the command signal from the DSP, the event generator 190 generates the chirp control signals. Thus, the event generator removes the chirp control signal processing function from the DSP 104. In the embodiment of FIG. 3, the chirp generator is located in the receiver 158. In other embodiments, however, the event generator 190 can be located in other portions of the radar system 14' (FIG. 3).

It should be understood that by removing the control signal waveform responsibility from the DSP 104 and providing an event generator circuit which is separate from the DSP, the event generator may provide more comprehensive chirp control signals. This is because the DSP must serve multiple and differing types of requests while the event generator serves only to generate control signals related to generation of the chirp control signals. Also, the required accuracy of the timing signals created by the event generator also precludes the event generator from being the direct responsibility of the DSP 104. Also, the DSP is now freed from this time consuming activity, so it can now perform additional critical tasks in parallel.

Each ramp signal has a start voltage and an end voltage. The ramp signal is coupled to a signal source. In response to the ramp signals, the signal source generates RF signals having waveform and frequency characteristics controlled by the ramp signal. The transmitter feeds the RF signals to the transmit antenna 154 which emits (or radiates) the RF signals as RF chirp radar signals. As used herein, the term "chirp" is used to describe a signal having a characteristic (e.g., frequency) that varies with time during a time window. Typically, each chirp has an associated start and end frequency. A chirp may be a linear chirp, for which the frequency varies in a substantially linear fashion between the start and end frequencies. The chirp may also be a non-linear chirp.

The DSP 104 initiates transmission of ramp signals by the event generator 190 for so-called major cycles. The DSP 104 causes the event generator to execute a pre-programmed set of actions, which will cause the signal source (e.g., the VCO) to be modulated accordingly, for each minor cycle in turn. A major cycle is a time period during which signals are received in a designated set of the receive beams 22a-22g. The designated set of receive beams may be all of the receive beams 22a-22g or the designated set of receive beams may be only some of the receive beams 22a-22g. A major cycle is comprised of one or more so-called minor cycles. A minor cycle is a period of time during which signals are received in a subset of the designated set of receive beams.

As mentioned above and as will be described herein further below, the DSP 104 causes the event generator 190 (FIG. 4) to execute for each minor cycle. Thus, for each major cycle, the DSP issues a so-called "go" command several times per major cycle. The event generator 190 (FIG. 4), in turn, provides controls signals or values in each minor cycle including the transmission of the ramp control signals (or more simply "ramp signals") in each minor cycle.

The transmit antenna 154 may be provided having one or a plurality of transmit beams. Regardless of the number of transmit beams, the transmit antenna 154 emits RF chirp radar signal in a desired field of views (e.g., summed or individually covering the detection zone 24 in FIG. 1). The transmit beams may be similar or different in antenna pattern and may be similar or different in fields of view. Their fields of view may overlap to varying extents, from completely to not a all.

The receive antenna system 160 may be provided having one or a plurality of receive beams. The receive beams may be similar or different in antenna pattern and may be similar or different in fields of view. Their fields of view may overlap to varying extents, from completely to not a all. The SOD 14 in FIG. 1, for example, utilizes seven receive beams 22a-22g. Each of the receive beams receives return or echo radar signals, or otherwise generates and/or receives noise signals. Signals received through the receive beams are directed to the radar receiver 158. The radar receiver 158 receives the signals provided thereto from the antenna, down converts the received RF signals to an intermediate frequency (IF) signal, and provides an output signal on signal path 148. In addition to the frequency down conversion, the receiver 158 appropriately processes the RF input signals provided thereto from the receive antenna system 160 such that the output signals on signal path 148 can be appropriately received and processed by the DSP 104.

The signal provided to the input of DSP 104 has a frequency content, wherein signal level peaks which occur at different frequencies correspond to detected objects at different ranges. The DSP 104 analyzes the signals provided thereto and identifies objects in the detection zone 24 or 25.

Some objects identified by the DSP 104 may be objects for which an operator of the first vehicle 12 (FIG. 1) has little concern and need not be alerted. For example, an operator of vehicle 12 may not, in some instances, need to be alerted as to the existence of a stationary guardrail along the roadside. Thus, criteria additional to the presence of an object in or near the detection zone may be used to determine when an alert signal should be generated and sent to the operator.

To utilize further criteria, the control processor 108 receives object detections on a bus 106 from the DSP 104. The control processor 108 applies a series of factors and characteristics (i.e., criteria used in addition to that used by DSP 104 to identify an object) to control generation of an alert signal. For example, upon determination by the control processor 108, the alert signal may be generated and sent through a bus 114 to CAN transceiver 120 and communicated on the CAN bus 66, which is indicative not only of an object in the detection zone 24, but also is indicative of an object having predetermined characteristics being in the detection zone. In other embodiments, an alert signal may be communicated by control processor 108 on a bus 122 through the HMI driver 118 to the HMI bus 68.

The circuit board 102, the circuit board 150, and the circuit board 156 are comprised of materials having known behaviors for signals within particular frequency ranges. It is known, for example, that fiberglass circuit boards have acceptable signal carrying performance at signal frequencies up to a few hundred MHz. LTCC circuit boards and PTFE circuit boards are know to have acceptable signal carrying performance at much higher frequencies. Thus, in the case where circuit board 102 is provided as a fiberglass circuit board and circuit boards 150, 156 are provided from LTTC and/or PTFE, the lower frequency functions of the SOD system 14 are disposed on the circuit board 102, while the functions having frequencies in the radar range of frequencies (e.g., 2 GHz) are disposed on the LTCC and on the PTFE circuit boards 150, 156, respectively. Nevertheless other suitable materials may be used.

Figure 4:
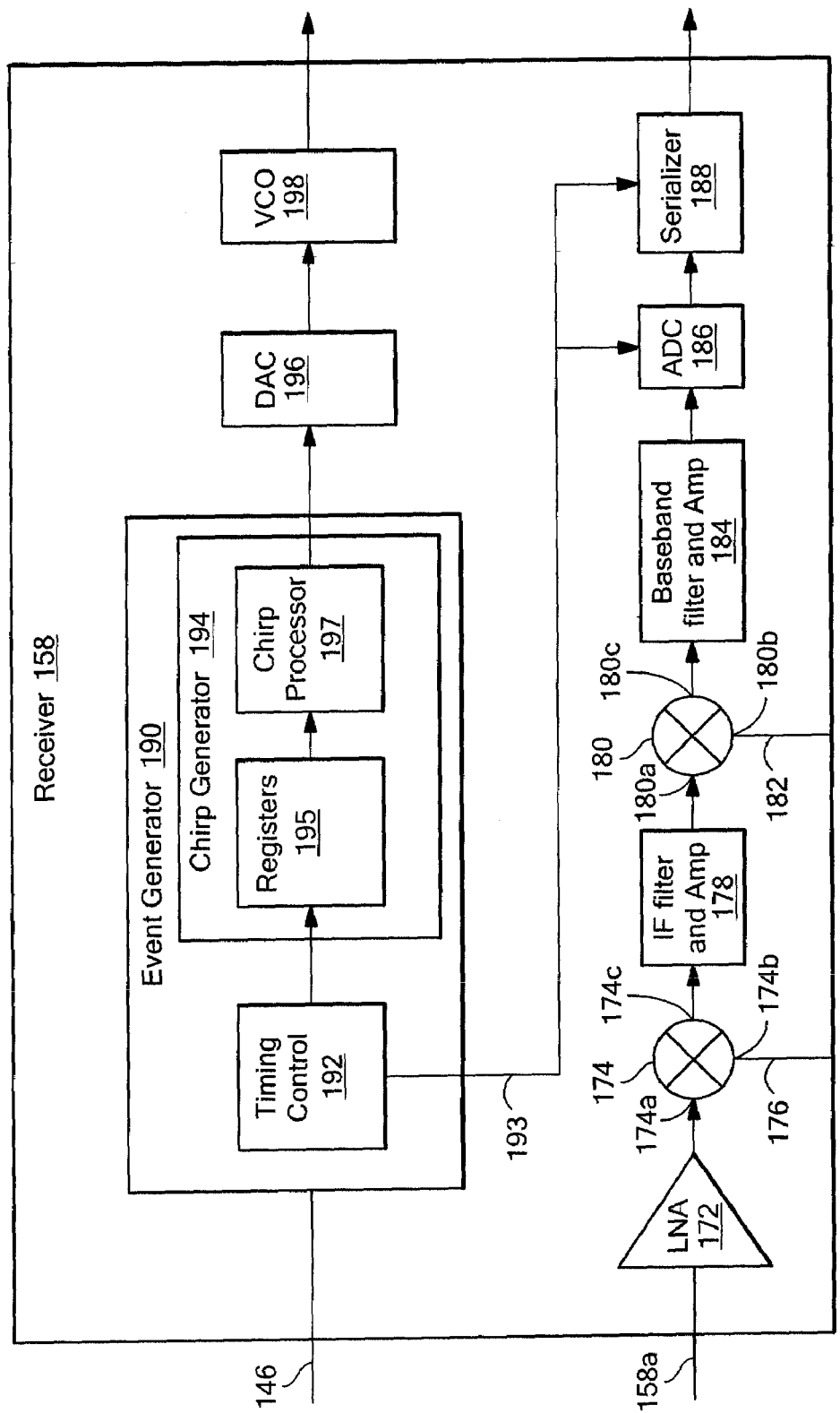
FIG. 4 is a block diagram of a receiver.

Referring to FIG. 4, the receiver 158 includes an RF low-noise amplifier (LNA) 172, a first frequency down converter circuit (or mixer) 174, an intermediate frequency (IF) filter and amplifier circuit 178, a second frequency down converter circuit (or mixer 180), a baseband filter and amplifier circuit 184, an analog-to-digital converter (ADC) 186 and a serializer 188. An RF signal received through antenna 160 (FIG. 3) is provided to receiver input 158a and subsequently to an input of the RF LNA 172. The RF LNA 172 provides an amplified version of the signal fed thereto to a first input port 174a of a mixer 174. An RF signal fed along signal path 176 to a second port 174b of the mixer 174 serves as a first local oscillator (LO) signal. Illustrative frequencies for the RF signals from the amplifier 172 and the first LO signal are on the order of 24 GHz and 17 GHz respectively. Mixer 174 receives the RF and the first LO signals provided thereto and provides a down-converted or intermediate frequency (IF) signal at a third port 174c thereof.

The down-converted signal is fed from the third port 174c of the mixer 174 to an IF filter and amplifier circuit 178. The IF filter and amplifier circuit 178 provides a suitably filtered and amplified version of the down-converted signal fed thereto to a first input port 180a of the second mixer 180. An RF signal is fed along a signal path 182 to a second port 180b of the mixer 180 and serves as a second LO signal. Illustrative frequencies for the RF signals from the filter and amplifier circuit 178 and the LO signal are on the order of 6 GHz. Although the exemplary receiver 158 is shown as a direct conversion, dual heterodyne receiver, other receiver topologies may also be used in the SOD system 14. Mixer 180 receives the RF and LO signals provided thereto and provides a second down converted or IF signal at a third port 180c thereof to an input port of a baseband filter and amplifier circuit 184. The baseband filter and amplifier circuit 184 provides a suitably filtered and amplified signal to an input of an analog-to-digital converter (ADC) 186.

The ADC 186 receives the analog signal fed thereto from filter and amplifier circuit 184 and converts the analog signal into digital signal samples which are serialized by a serializer 188 for further processing. In particular, the digital signal samples coupled from the serializer 188 to a DSP (e.g., DSP 104 in FIG. 3) which processes the signals fed thereto to determine the content of the return signal within various frequency ranges.

The event generator 190 includes a timing and control circuit 192 and a chirp generator 194. In general, the event generator 190 operates as a state machine by receiving input values (which are loaded into registers 195, for example) and in response to the input values, providing output values. Event generator 190 controls VCO 198 by sending control signals from the chirp processor through the DAC 196 to the VCO 198. It should be understood that in the embodiment of FIG. 4, since the signal source which generates RF signals to be eventually transmitted via an RF transmit path of the radar is a VCO, then the control signals provided by the event generator to the VCO are provided as voltage control signals with the VCO responsive to the signal level (e.g., voltage level) of the voltage control signal. If the signal source were responsive to other types of signals or other types of signal characteristics (e.g., current signals rather than voltage signals or pulse repetition frequencies rather than signal level), then event generator 190 would provide a suitable control signal. In some embodiments, the VCO 198 may be of a type described, for example, in U.S. Pat. No. 6,577,269, issued Jun. 10, 2003, which is incorporated herein by reference in its entirety.

The event generator 190 also controls processing of digital samples from the serializer 188 by sending a control signal from the timing control circuit 192 to the ADC 186. As indicated above, the digital processor 104 initiates processing of a major cycle while the event generator 190 controls the minor cycles which allows DSP 104 to perform other functions such as detection processing.

The chirp generator 194 includes a plurality of registers generally denoted 195, and a chirp processor 197. Some of the registers 195 may be assigned to receive compensation values (e.g., in the form of slope information) which are used to compensate for any non-linearity in the VCO 198. As will be explained in detail in conjunction with FIG. 5 below, in one embodiment, a ramp control signal can be partitioned into a certain number of segments and a corresponding number of registers 195 can be assigned to hold compensation values for each segment of the ramp signal.

As will be described further herein, other ones of the registers 195 can hold values for controlling other parameters for forming chirp waveforms. For example, the parameters may include time delays between chirp waveforms, a start voltage for each chirp waveform, a number of chirp waveforms for each minor cycle and a type of chirp waveforms. The register 195 may also be configured so that a register corresponds to a parameter. For example, one of the registers 195 can receive a single value which controls the number of chirp waveforms used in a minor cycle and a different one of the registers can receive a single value which controls the type of chirp waveform in each chirp period. Alternatively, the registers 195 may be configured so that a single value (parameter) loaded into the register 195 defines multiple parameters (e.g., a single value defines both the number of chirp waveforms and the type of chirp waveforms in a minor cycle or multiple minor cycles).

It should thus be appreciated that there is a correspondence between the number of registers 195 designated as slope registers and the number of segments in the ramp signal. The particular number of registers designated as slope registers to use in any particular application is based upon a variety of factors including but not limited to the expected nonlinearity in the slope of the ramp signal. It should be understood that the total linear accuracy of the ramp waveform is affected by the total number of segments the Event Generator can control. Each individual linear segment is fit into a non-linear curve. The larger the number of segments, the more accurate the final result will be.

Figure 5:
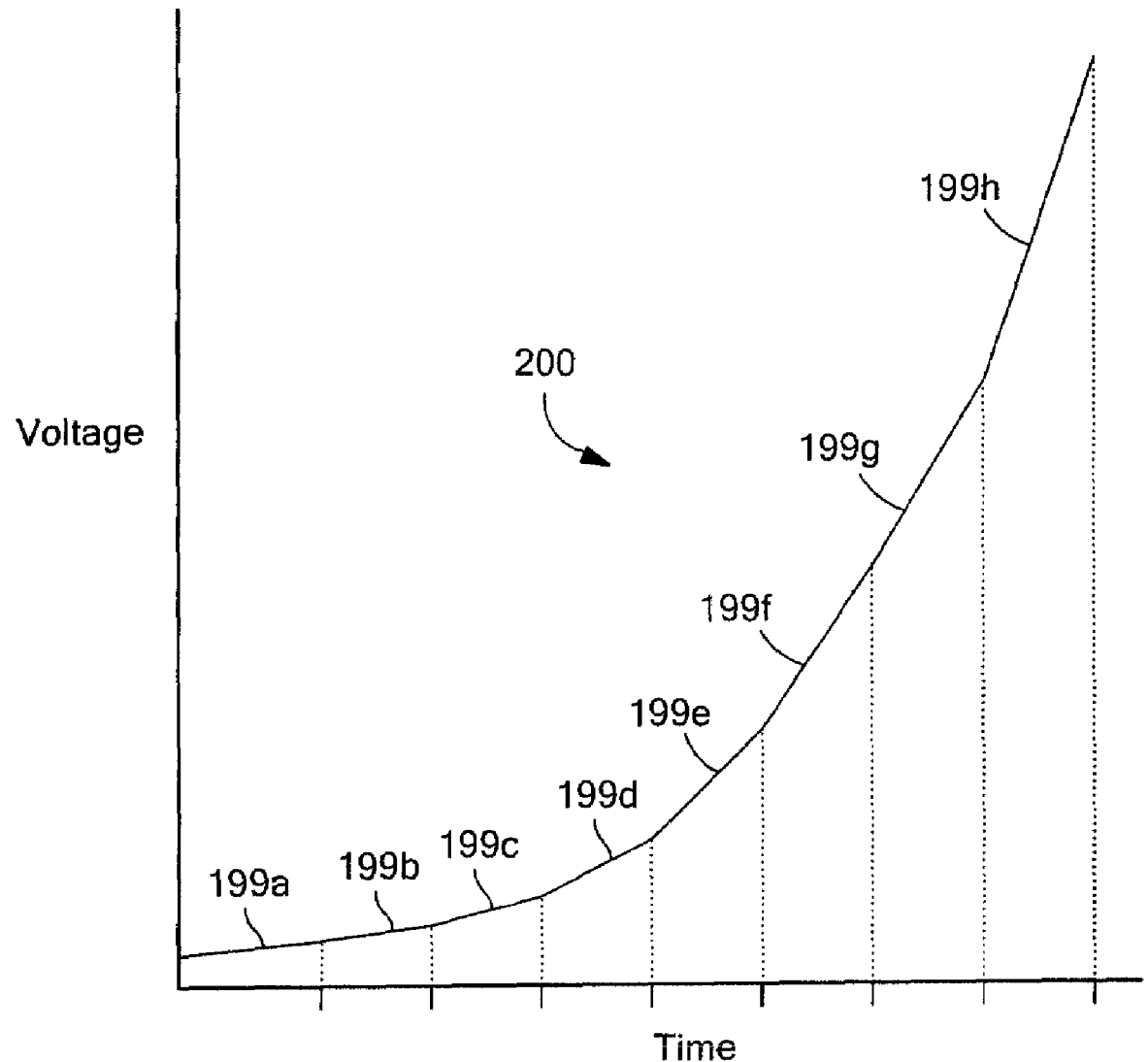
FIG. 5 is a graph of a ramp signal.

As shown in FIG. 5, for example, a ramp signal 200 having eight segments (i.e., a segment 199a, a segment 199b, a segment 199c, a segment 199d, a segment 199e, a segment 199f, a segment 199g and a segment 199h) is shown. Thus, in this case, registers 195 can include eight registers designated as slope registers (i.e., one slope register for each segment).

The DSP 104 computes a slope value for each of the segments 199a-99h and stores the slope value in a corresponding one of the registers 195 designated as slope registers. Thus, each of the registers designated as slope registers has stored therein a value corresponding to a slope of a different one of the eight ramp signal segments 199a-199h. In one embodiment, each of the segments 199a-199h lasts for an equal period of time. In other embodiments, some or all the segments may be different lengths of time.

The slope value for each segment may be determined using a variety of different techniques. In one technique, for example, SOD 14 utilizes a calibration signal. The calibration may be performed as part of an additional minor cycle. The SOD transmits the calibration signal (where the calibration signal is simply a signal have known characteristics) and receives the corresponding echo signal. The DSP 104 processes the calibration echo signal to determine compensation value which can be used to adjust for the VCO non-linearity. The slopes of each of the segments 199 of the compensation signal are stored in the registers 195.

In one embodiment, the chirp processor 197 may include an adder mechanism that adds a slope value to the previous sum from one of the registers 195. The adder is used to create the ramp waveform over time. The VCO is connected to a the digital to analog converter 196 which is used to modulate the VCO output as directed by the event generator. To create the ramp waveform, the start value register is first loaded into one of the adder's operand registers. Then, the start value is added to the first slope register value to create the next step on the ramp waveform. The adder continues to increase the value to the D/A converter for up-chirps (or decrease the value on down chirps) on each subsequent add, until the first segment is complete. This process is then repeated for the other 7 segments.

Figure 6:
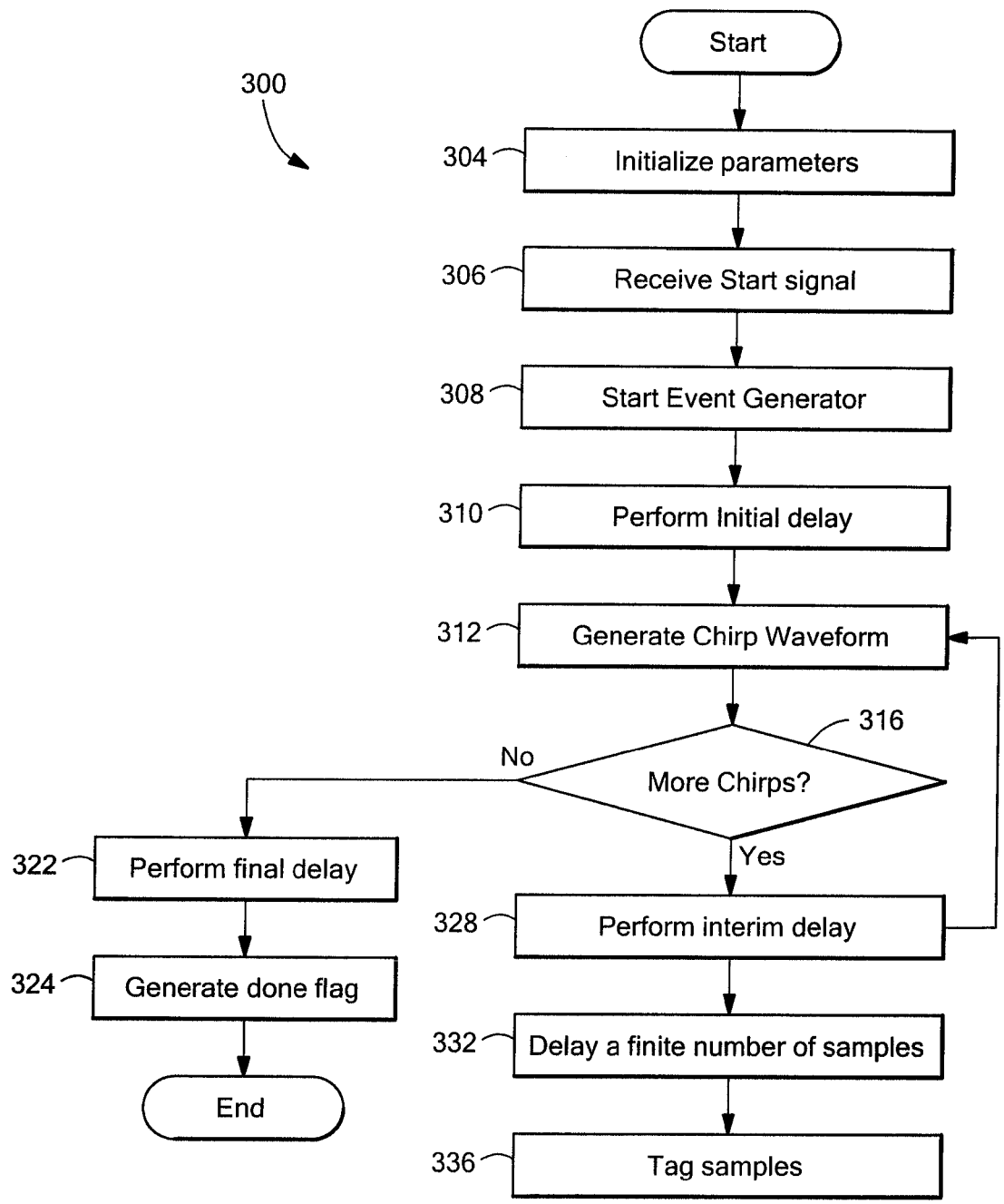
FIG. 6 is a flowchart of an exemplary process for generating event signals.

FIG. 6 is a flow diagram showing an exemplary process 300 for controlling a signal source (e.g., the VCO 198 in FIG. 4) and synchronizing digital samples from an ADC (e.g., the ADC 186 in FIG. 4) during a minor cycle. The processing may be performed by a processing apparatus which may, for example, be provided as part of a SOD system such as that described above in conjunction with FIGS. 1-3.

Turning now to FIG. 6, the exemplary process for controlling a signal source (e.g., the VCO 198 in FIG. 4) and synchronizing digital samples (e.g., digital sample from the ADC 186 in FIG. 4) during a minor cycle begins by initializing parameters as shown in processing block 304.

Figure 8:
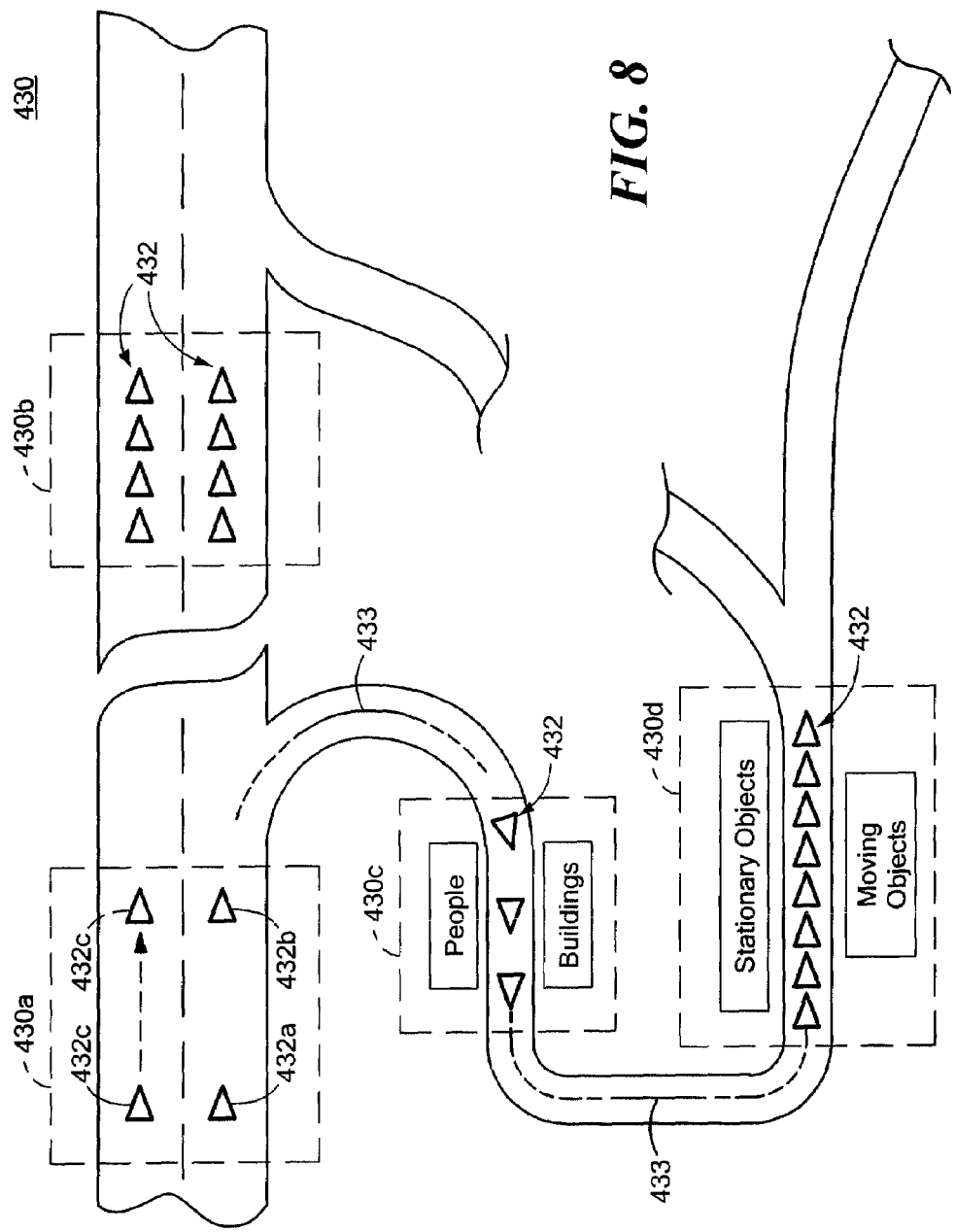
FIG. 8 is a map illustrating different traffic environments.

During an initialization process for the exemplary system shown in FIG. 4, for example, DSP 104 loads slope values into the registers 195, one slope value for each register designated as a slope register. DSP 104 may also load other parameters/values into registers 195. These parameters include the types of chirp waveforms to be used, delays before, after and between the chirp waveforms, the number of chirp waveforms to be used in a minor cycle, and the start voltage of each chirp waveform. A user may designate each of the parameters, for example, using a computer (FIG. 8).

After initialization, process 300 receives a start signal as shown in processing block 306 and the event generator operation begins as shown in processing block 308. In the embodiment of FIG. 4, for example, DSP 104 sends a command signal to the event generator 104 to commence event signal generation.

As shown in processing block 310, an initial delay is performed. In some embodiments, an initial delay is needed to allow the RF signal chain to settle, as sometimes a noise anomaly is introduced upon changing settings of the radar. It is important that the delay is adjustable to compensate for different applications or implementations. The initial delay can be set to zero if no anomaly is introduced.

Figure 7:
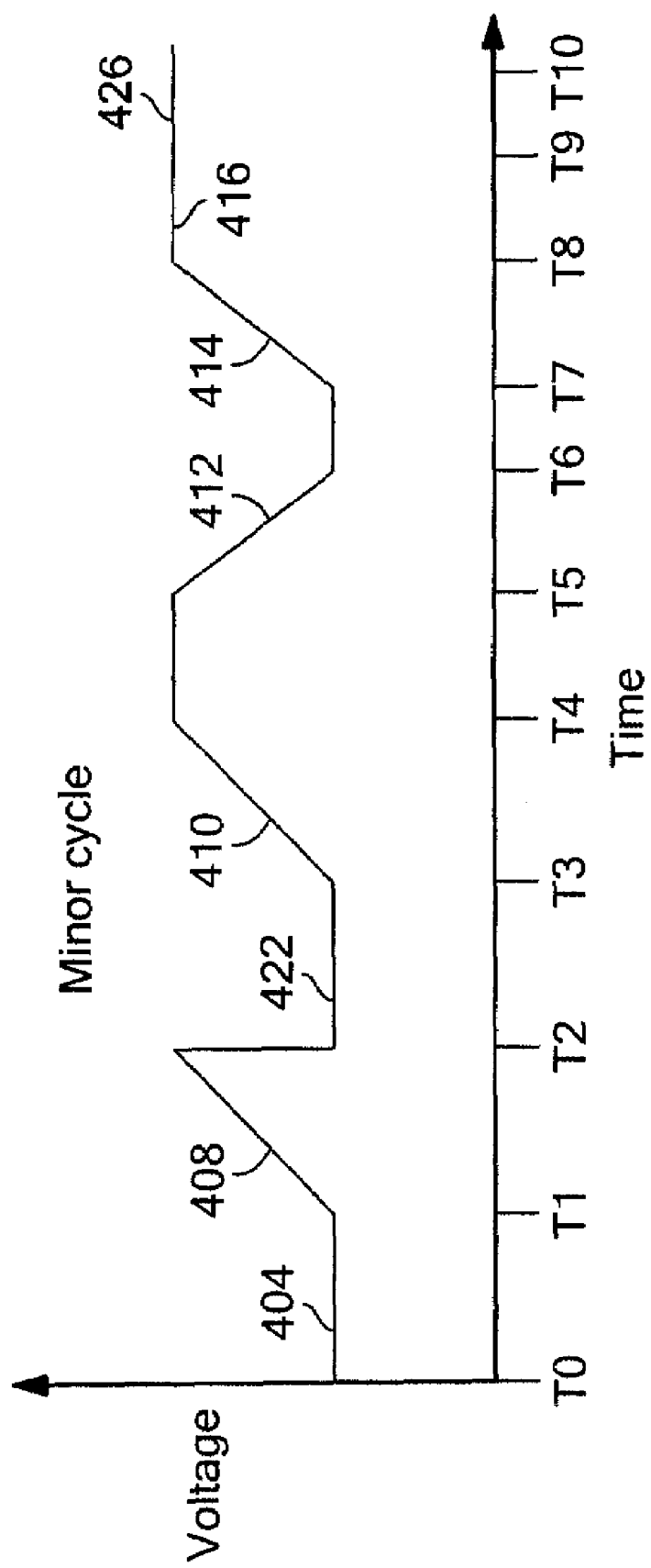
FIG. 7 is a graph of chirp waveforms over a minor cycle.

Referring briefly to FIG. 7, a waveform for a minor cycle includes an initial delay 404 which occurs between time T0 and time T1. It should be appreciated that delay 404 occurs before any chirp waveforms are generated (i.e., before any chirp periods commence).

Referring again to FIG. 6, after the initial delay a chirp waveform control signal is generated as shown in processing block 312. The chirp waveform control signal may be an up-ramp control signal which generates a so-called "up-chirp" RF waveform, or a down-ramp control signal which generates a so-called "down-chirp" RF waveform, a continuous wave (CW) control signal which generates a CW RF mode waveform. The generation of each chirp waveform is designated by the parameters stored in registers 195. For example, having the slope of the chirp waveforms, the start voltage of the chirp waveforms and the time delays before and after the chirp waveform allows a user to generate the waveforms in FIG. 7. As used herein, the term "chirp period" generally refers to the duration of the modulated waveform, excluding the delays. As will be shown below, FIG. 7 includes five chirp periods over a minor cycle (between times T0 and T10). It should be understood that any other type of chirp waveform control signal suitable to generate an RF waveform shape for use in a particular application may also be used. It should also be understood that the chirp control signal waveform may also be provided from any combination of two or more of the above up-ramp, down-ramp or CW mode control signal waveforms.

Referring briefly again to FIG. 7, a first up-ramp (or up-chirp) control signal waveform 408 is shown between times T1 and T2 (a first chirp period), a second up-chirp waveform 410 is shown between times T3 and T4 (a second chirp period) and a third up-chirp waveform 414 is shown between times T7 and T8 (a fourth chirp period). The "up-chirp" waveform starts at a low voltage and forms a linear ramp to a higher voltage. It should be appreciated that although the up-chirp control signals 408, 410 are shown as linear up-chirps in FIG. 7, those of ordinary skill in the art will appreciate that they need not be linear and that non-linear shapes may also be used. It should thus be appreciated that FIG. 7 merely Illustrates but one example of a very large number of other waveform combinations which are also possible.

The chirp control signal waveform may also be provided as a down-ramp (or a "down-chirp") waveform such as "down-chirp" waveform 412 which occurs between time T5 and time T6 (a third chirp period). The "down-chirp" waveform starts at a high voltage and ends at a lower voltage. It should be appreciated that although the down-chirp control signal 412 is shown as a linear down-chirp in FIG. 7 (i.e., a linear ramp between the high and low voltages), those of ordinary skill in the art will appreciate that they need not be linear and that non-linear shapes may also be used.

The chirp waveform may further be a "continuous wave (CW) mode" control signal waveform such as a "CW mode" waveform 416 which occurs between time T8 and time T9 (a fifth chirp period). The CW mode chirp control signal is a fixed voltage which results in an RF signal having a fixed frequency (i.e., a CW RF signal).

Referring again to FIG. 6, once a chirp waveform control signal is generated and provided to the controllable signal source, process 300 continues by determining if additional chirps are needed as shown in decision block 316. If no additional chirp waveforms are needed (i.e., no remaining chirp periods), then processing continues to processing block 322 in which a final delay is performed and then a so-called "done" flag is set to indicate that no additional chirp control signal waveforms are needed as shown in processing block 324.

Referring again to FIG. 7, a final delay 426 occurs after time T9 and after the CW mode chirp waveform 416. In some embodiments, a delay is required to allow the RF signal chain to settle, as the final retrace of the ramp waveform can cause a noise anomaly. For example, event generator 190 (FIG. 4) sends a completion signal to the DSP 104 (FIG. 4) indicating that the minor cycle is complete.

Referring again to FIG. 6, if in decision block 316, a decision is made that additional chirp waveforms are needed (i.e., there are remaining chirp periods), then process 300 performs an interim delay as shown in processing block 328 and then processing proceeds to processing blocks 332 and 336 in which a predetermined number of samples are delayed and then tagged.

In the exemplary control signal waveform of FIG. 7, for example, an interim delay 422 occurs between time T2 and time T3 after the up-chirp waveform 408. Process 300 generates another chirp waveform (312).

Also, with reference to the exemplary embodiment of FIG. 4, when the ADC 186 is first started the initial output from the ADC may not contain useful samples. Thus, event generator 190 waits until a predetermined number of samples are processed by the ADC 186. It should be appreciated that selecting the number of samples is dependent on choosing range accuracy versus overall time of the major cycle. A larger number of samples provides better range accuracy but takes more time. A smaller number of samples, on the other hand, takes less time (and therefore allows more major cycles per second) but gives less range accuracy. In addition, the event generator 190 synchronizes processing (performed by the DSP 104) of the digital samples received from the serializer 188 with the timing of the ramp signals utilized in the minor cycles. The samples are then transmitted to the DSP.

In the embodiment of FIG. 4, for example, each digital sample includes three parts. A first part includes clock data, a second part includes receive data and the third part includes a frame synchronization indicator or "flag." the timing and control circuit 192 tags the samples by sending a command along a bus 193 to the ADC 186 to change, for example, the frame synchronization flag from one value to another value (e.g., from a logical "0" value to a logical "1" value) thereby alerting the DSP 104 that the digital samples received from the serializer 188 and having a "1" flag are to be processed. The timing and control circuit 192 also sends timing and control signals to DAC 196 and serializer 188.

It will be appreciated by those skilled in the art that controlling the VCO 198 using process 300 may be modified so that a single parameter may be received from the register 195 which designates the number of chirp waveforms and the type of chirp waveforms in a minor cycle or multiple minor cycles. Furthermore, a single parameter may designate a number of chirp waveforms, the type of chirp waveform along with a start time and end time of the chirp periods.

The chirp generator 194 may be adjustable. For example, the chirp generator may change the chirp waveforms generated at different times. In one example, the chirp generator 194 adjusts the chirp waveform generated based on the operating environment of the SOD 14' at a particular time. In one particular example, a chirp waveform generated while in a highway environment may be adjusted to a different chirp waveform when the SOD 14' is operated in a city environment.

Referring now to FIG. 8, a map 430 illustrates portions of several different roadways on which a plurality of vehicles generally denoted 432 travel. Some or all of the vehicles may have disposed thereon a vehicle radar of the type described herein (e.g., a SOD). Map 430 also illustrates several different traffic environments (or more simply environments) including a first traffic environment 430a corresponding to a highway traffic environment having a light to a moderate amount of traffic traveling thereon (referred to herein as a "low-traffic highway environment"), a second traffic environment 430b corresponding to a highway traffic environment having an extremely heavy amount of traffic thereon (i.e., also referred to herein as a "high-traffic highway environment" or "a highway traffic jam"), a third traffic environment 430c corresponding to a city traffic environment having light city traffic (referred to herein as a "low-traffic city environment") and a fourth traffic environment 430d corresponding to a city traffic environment heavy having city traffic (referred to herein as a "high-traffic city environment" or "a city traffic jam"). It should thus be appreciated that a vehicle radar is subject to a number of different traffic scenarios as well as different environmental scenarios.

In region 430a, for example, a SOD carrying vehicle 432a traveling along the relatively open highway travels at or about the highway speed limit (e.g., approximately in the range of about fifty miles per hour (mph) to about seventy mph). Highways typically have multiple travel lanes with two travel lanes being shown in region 430a. In a low-traffic highway environment, other vehicles (e.g., vehicle 432b) traveling in the same lane as the SOD carrying vehicle 432a tend to be spaced from the SOD carrying vehicle 423a by distances of about 280 feet (e.g., in accordance with the well-known three-second rule). On the other hand, other vehicles (e.g. vehicle 432c) traveling in a different lane as the SOD carrying vehicle 432a may not be spaced apart from the SOD carrying vehicle. It should be appreciated that in a low-traffic (or open) highway environment, a SOD carrying vehicle can commonly encounter other vehicles moving at or near the same speed and in generally the same direction as the SOD carrying vehicle. For example, two vehicles such as vehicles 432a and 432c may travel along the highway adjacent to each other and at approximately the same highway speed. The SOD carrying 432a vehicle can also encounter other moving road side objects including motorized and non-motorized moving objects. It should, however, also be appreciated that in a low-traffic (or open) highway environment, the SOD can encounter, on occasion, non-moving road side objects such as parked (or stopped) vehicles, guard rails and buildings. Thus, knowing typical or commonly incurred highway conditions or scenarios in region 430a, the SOD can operate in a so-called "low-traffic highway mode" of operation which takes into account factors and traffic scenarios expected to be encountered in such an environment.

If the SOD carrying vehicle follows path 433 off the highway, then the SOD carrying vehicle enters city region 430c which is a low-traffic city environment. A SOD carrying vehicle traveling along a city road with a light amount of traffic typically travels at or about the road speed limit (e.g., approximately in the range of about fifteen mph to about forty mph). Other vehicles traveling in the same lane as the SOD carrying vehicle tend to be spaced from the SOD carrying vehicle by distances in the range of about 3 feet to about 50 or more feet (e.g., typically in accordance with the judgment of other vehicle operators and common practice in the area). In a multi-lane city road scenario, other vehicles traveling in a different lane than the SOD carrying vehicle may be adjacent to and traveling at about the same speed as the SOD carrying vehicle (e.g., the two vehicles may be traveling at speeds within several mph of each other). It should be appreciated that in a city environment, the SOD can encounter many non-moving road side objects such as parked (or stopped) vehicles and buildings as well moving road side objects such as people, bicycles, scooters, and other motorized and non-motorized moving objects. The SOD carrying vehicle may also encounter traffic lights which cause the SOD carrying vehicle (and other vehicles) to stop. Thus, knowing typical factors and conditions in region 430c, the SOD can operate in a so-called "low-traffic city mode" of operation.

If the SOD carrying vehicle follows path 433 further, then the SOD carrying vehicle enters city region 430d which is a high-traffic city environment. The high-traffic city environment may be similar to the low-traffic city environment 430c with the exception that a large number of vehicles 432 are traveling along the same city road (or the same group of city roads) which result in a city traffic jam. In this environment, the vehicles in the same travel lane tend to be closely spaced (e.g., typically about twenty feet or less) and move at a very slow absolute speeds (e.g., ten mph or less) as well as slow relative speeds. Also, vehicles tend to only move for short distances before stopping for a brief period of time and then moving again. Thus, knowing typical factors and conditions in region 430d, the SOD can operate in a so-called "high-traffic city mode" of operation.

It should be appreciated that in some cases, the SOD carrying vehicle may enter a region such as region 430b corresponding to a so-called "high-traffic highway environment." the high-traffic highway environment may be similar to the high-traffic city environment 430d in that a large number of vehicles 432 are traveling along the same road (in this case, the same highway road) which results in a highway traffic jam. In this environment, the vehicles 432 in the same travel lane tend to be closely spaced (e.g., typically about twenty feet or less) and move at a very slow speed (e.g., ten mph or less). Also, vehicles tend to only move for short distances before stopping for a brief period of time and then moving again. Thus, knowing typical factors and conditions in region 430b, the SOD can operate in a so-called "high-traffic highway mode" of operation.

The accuracy with which the speed and position of a target (e.g., a vehicle or other moving or non-moving object) can be measured is affected by the both the absolute and relative speed of the target as well as the distance of the target from the radar. For example, in general, the closer two objects are to each other and the slower the relative speed between them, the smaller the changes that are measured ("the smaller the granularity"). That is, the velocity-to-range coupling is reduced, so that the accuracy of the measurement is reduced. Velocity-to-range coupled is the shift in frequency of the echo caused by the Doppler effect. For one chirp, it will make objects with nonzero relative velocity appear closer or further in range compared to an object with zero relative velocity. One way to increase the granularity of the measurement (i.e., improve the velocity-to-range coupling) is to lengthen the period of the chirp waveform. Typically, doubling the period of the chirp waveform doubles the magnitude of the changes.

This is because the increment between bins in an FFT spectrum ("lines on the ruler") become half their previous value, so that finer differences in frequency can be resolved in the FFT spectrum. For example, in a system which uses a chirp control signal having a linear slope to control a signal source such that the signal source sweeps from a first (or start) frequency to a second (or stop) frequency, reducing the slope of the chirp control signal so that the time it takes the signal source to sweep from the first frequency to the second frequency decreases the granularity of the measurements.

For example, in a highway environment having light to moderate traffic (e.g., the low-traffic (or open) highway environment 430a discussed above in conjunction with FIG. 8), vehicles tend to be positioned further apart from each other and traveling at faster absolute speeds when compared with typical positions and speeds of vehicles in a city traffic environment (e.g., the low-traffic and high-traffic city environments 430b, 430c discussed above in conjunction with FIG. 8). Conversely, in a city environment, vehicles tend to be positioned relatively close to each other and travel at absolute speeds which are relatively low when compared with permissible highway speed limits. Since in a city environment vehicles tend to be positioned relatively close together, move at slow absolute speeds (i.e., when compared with highway speeds) and also move at slow relative speeds (i.e., the relative speeds between two vehicles tend to be low) it is desirable to utilize a chirp waveform which provides a finer granularity ("a city chirp waveform") in order to improve the accuracy with which the position and velocity of other vehicle is determined. This is opposed to a chirp waveform used in a highway environment ("highway chirp waveform") where the finer granularity may not typically be required due to typical vehicle spacings and speeds (both relative and absolute speeds).

Also, to account for Doppler effects in radar processing, chirp waveforms can include an "up chirp" portion and a "down chirp" portion. When a waveform having both up chirp and down chirp portions are used, an average is taken between resultant waveform responses to determine position and relative velocity of an object at the moment a measurement is taken.

Figure 9A:
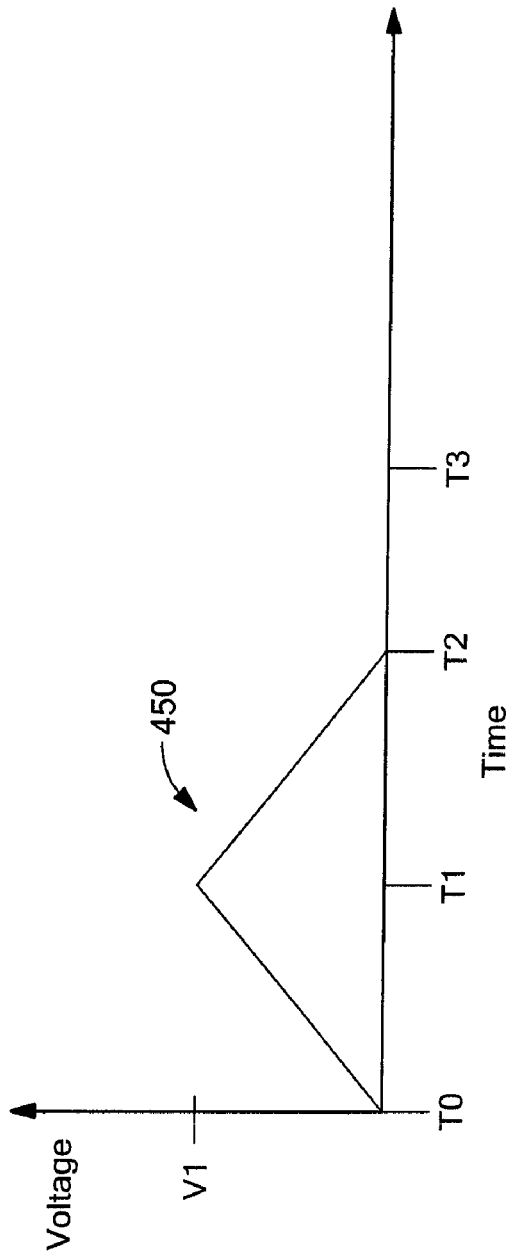
FIG. 9A is a graph of an exemplary chirp waveform used in a highway traffic environment.
Figure 9B:
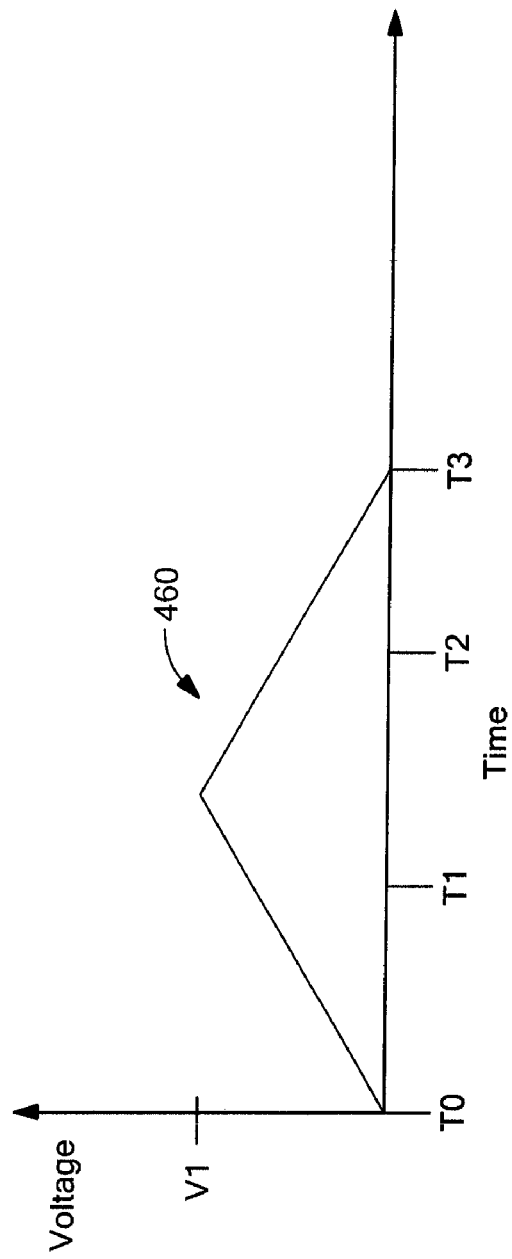
FIG. 9B is a graph of an exemplary chirp waveform used in a city traffic environment.

As illustrated in FIGS. 9A and 9B, one way to achieve increased granularity in the city chirp waveform over the highway chirp waveform, is to spread over a longer period of time than the highway chirp waveform.

Referring to FIG. 9A, for example, a highway chirp waveform 450 has a period which begins at time T0 and ends at time T2. The highway chirp waveform 450 has an up ramp portion (here shown as a linear up-ramp portion), a down ramp portion (here shown as a linear down-ramp portion) and a maximum amplitude of V1.

Referring to FIG. 9B, a city chirp waveform 460 has a period which begins at time T0 and ends at time T3. The city chirp waveform 460 has an up ramp portion (here shown as a linear up-ramp portion), a down ramp portion (here shown as a linear down-ramp portion) and a maximum amplitude of V1.

By comparing the highway chirp waveform 450 with the city chirp waveform 460, it can be seen that the city chirp waveform has a period which is longer than the period of the highway chirp waveform. It can also be seen that the highway waveform 450 has a greater slope in the up chirp and down chirp portions of the waveform than the slope in the up chirp and down chirp portions of the city chirp waveform 460.

Figure 10:
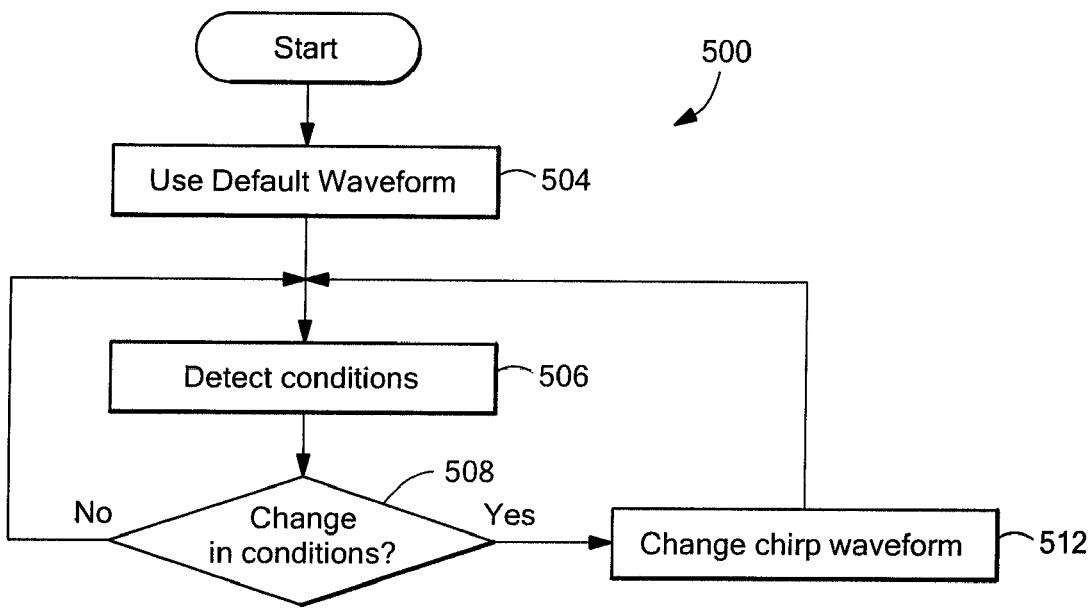
FIG. 10 is a flowchart of an exemplary process for adjusting chirp signals.

Referring to FIG. 10, a process for adjusting the chirp waveforms based upon an environment of the SOD 14' is an exemplary process 500. Process 500 uses a default waveform (504). For example, the chirp processor 197 uses a default chirp waveform designated by a value stored in one or more of registers 195 (FIG. 4) as the SOD 14' is initialized (e.g., a user activates the SOD 14'). The default chirp waveform may be the highway chirp waveform 450 or the city chirp waveform 460 or any another chirp waveform designated. Process 500 detects the conditions in the environment (506). For example, controller 108 detects the relative speeds of other vehicles, the speed of the vehicle 12 and/or the number of vehicles and determines whether the vehicle in which the SOD is disposed is traveling in a highway environment or a city environment. In particular, the control processor 108 compares the up and down chirp spectrums. If there is a slight shift due to Doppler between the "up chirp" peak locations and the "down chirp" locations, the control processor 108 may instruct the chirp processor 197 to switch to a longer chirp period in order to increase the shift magnitude. For example, the control processor 108 sends a signal through DSP 104 to the receiver 158 via the SPI bus 147 and the busses 144, 146 and specifically to the chirp generator 194. In particular, the registers 195 are loaded with the appropriate parameters for the chirp processor 197 to generate the appropriate chirp waveform. In other embodiments, DSP 104 may perform all or some of the detection processing.

Depending upon the conditions detected in processing block 506, the SOD begins operating with a particular chirp waveform. Processing then proceeds to decision block 508 which implements a loop in which conditions are detected and then a decision is made as to whether the SOD should operate with a waveform suitable for a particular type of traffic environment (e.g., a highway traffic environment or a city traffic environment).

In particular after processing block 506, processing proceeds to decision block 508 in which a decision is made as to whether the operating mode of the SOD should change. For example, if the SOD is operating in a light-traffic city mode, then based at least in part upon the conditions detected in processing block 506, decision block 508 determines whether the SOD operating mode should be changed. For example, based upon traffic conditions or changes in traffic conditions, the SOD operating mode could be changed to high-traffic city mode, high-traffic highway mode, low-traffic highway mode or any other mode available for SOD operation.

If a decision is made in decision block 508, to not change SOD operating modes, then processing proceeds back to processing block 506. If on the other hand, a decision is made to change the operating mode of the SOD, then processing proceeds to processing block 512 in which the SOD begins using the appropriate operating mode (e.g., by adjusting characteristics of the chirp waveform used by the SOD). For example, the value placed in a certain one or ones of the registers 195 can be changed to cause the SOD to use a desired waveform. For example, in the case where it is desirable for the SOD to operate in a light-highway traffic mode, then a value which causes the SOD to use the highway chirp waveform 450 is stored in on or more or the registers 195 and then the chirp processor 197 provides appropriate instructions and/or control signals.

Figure 11:
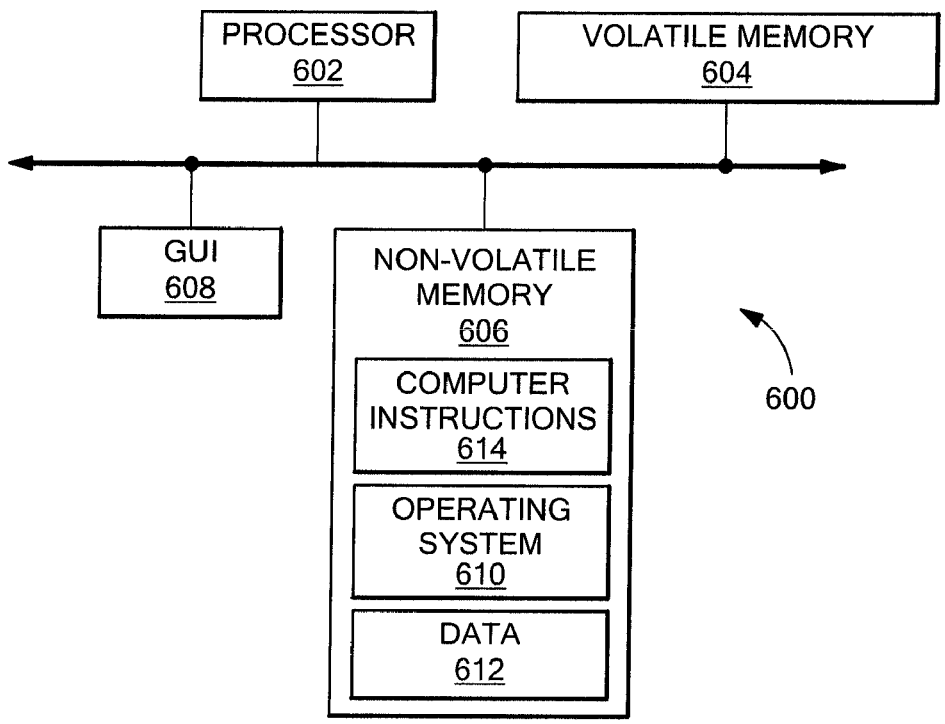
FIG. 11 is a block diagram of a computer system on which the processes of FIGS. 6 and 10 may be implemented.

FIG. 11 shows a computer 600 which includes a processor 602, a volatile memory 604, a non-volatile memory 606 (e.g., a flash memory) and a graphical user interface (GUI) 608. Non-volatile memory 606 stores operating system 610 and data 612 including event signal parameters such as time delays within a minor cycle (e.g., the initial delay, the interim delay(s) and the final delay), the start voltage of each chirp waveform, the slope of each chirp waveform, the number of chirp waveforms and a single parameter which designates the number of chirp waveforms and the type of chirp waveforms in a minor cycle or multiple minor cycles. Non-volatile memory 606 also stores computer instructions 614, which are executed by processor 602 out of the volatile memory 604 to perform processes 300 and 500. The GUI 608 may be used by a user to configure (1) the time delays between chirp waveforms (2), the start voltage of each chirp waveform, (3) the slope of each chirp waveform, (4) the number of chirps stored in the data 612, (5) a parameter that determines the type of chirp waveforms and the number of chirp waveforms in a minor cycle or multiple minor cycles, (6) a parameter that designates a type of chirp waveform and a chirp period and (7) chirp waveforms to use in different environments such as the city chirp waveform 460 and the highway chirp waveform 450. Additional parameters that can be controlled by the user include gain settings for the various amplifier stages, filter shaping, channel selection, and calibration points.

It should be appreciated that processes 300 and 500 are not limited to use with the hardware and software of FIG. 11; it may find applicability in any computing or processing environment and with any type of machine that is capable of running a computer program. Processes 300 and 500 may be implemented in hardware, software, or a combination of the two. Processes 300 and 500 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 300 and 500 and to generate output information.

The system may be implemented, at least in part, via a computer program product (i.e., a computer program tangibly embodied in an information carrier (e.g., in a machine-readable storage device or in a propagated signal, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processes 300 and 500. Processes 300 and 500 may also be implemented as a machine-readable storage medium, configured with a computer program, where upon execution, instructions in the computer program cause the computer to operate in accordance with processes 300 and 500.

The processes described herein are not limited to the specific embodiments described herein. For example, the processes are not limited to the specific processing order of FIGS. 6 and 10. Rather, any of the blocks of FIGS. 6 and 10 may be re-ordered, repeated, combined or removed, performed in parallel or in series, as necessary, to achieve the results set forth above.

While two SOD systems 14, 15 are shown in FIGS. 1 and 2, the system 50 may include any number of SOD systems, including a single SOD system. While the alert displays 82, 86 are shown to be associated with side-view mirrors, the alert displays may be provided in a variety of ways. For example, in other embodiments, the alert displays may be associated with a rear view mirror (not shown). In other embodiments, the alert displays are audible alert displays.

While the CAN bus 66 is shown and described, it will be appreciated that the SOD systems 14, 15 may couple through any of a variety of other busses within the vehicle 12, including, but not limited to, an Ethernet bus, local interconnect network (LIN) bus and a custom bus.

The system described herein is not limited to use with the hardware and software described above. The system may be implemented in digital electronic circuitry, or in computer hardware, firmware, software, or in combinations thereof.

While three circuit boards 102, 150, 156 are described herein, the SOD system 14 may be provided on more than three or fewer than three circuit boards. Also, the three circuit boards 102, 150, 156 may be comprised of other materials than described herein.

Method steps associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

The system is not limited to the specific examples described herein. For example, while the system described herein is within a vehicle radar system, the system may be used in any system utilizing radar Elements of different embodiments described herein may be combined to form other embodiments not specifically set forth above. Other embodiments not specifically described herein are also within the scope of the following claims.

What is claimed is:

1. A method of operating a vehicle radar system, the method comprising:

determining an environment in which the vehicle radar system is disposed;

selecting a mode of operation for the vehicle radar system based upon the determined environment; and generating a chirp signal based upon the determined environment, wherein the environment comprises one of a highway environment or a city environment, the city environment comprises vehicles moving at less relative velocities than the highway environment, wherein generating the chirp signal comprises:

generating a first chirp signal in the city environment; and generating a second chirp signal in a highway environment, the second chirp signal having a shorter period than the first chirp signal.

2. The method of claim 1 wherein determining the environment comprises determining velocities of other vehicles relative to the vehicle in which the vehicle radar system is disposed.

3. The method of claim 1 wherein determining the environment comprises determining a velocity of a vehicle in which the vehicle radar system is disposed.

4. The method of claim 1 wherein the city environment comprises a velocity of the vehicle being less than a velocity of the vehicle in the highway environment.

5. A vehicle radar system comprising:
a detection system configured to:
  detect vehicles;
  determine an environment surrounding a vehicle in which the detection system is disposed based upon at least a number of detected vehicles; and
  operate in one of a plurality of operating modes which are selected based upon the determined environment,
wherein the detection system is provided as a chirp radar system and said detection system changes operating modes by adjusting a characteristic of a chirp waveform,
wherein a first operating mode corresponds to a highway operating mode and a second operating mode corresponds to a city operating mode,
wherein the detection system provides a first chirp waveform in the city operating mode and a second chirp waveform in a highway operating mode,
wherein the second chirp waveform has a shorter period than the first chirp signal.

6. The system of claim 5 wherein the operating modes are object detection modes.

7. The system of claim 5 wherein in response to changes in the environment surrounding the detection system, the detection system dynamically changes the operating mode of the chirp radar system by changing the radar chirp.

8. The system of claim 5 wherein the detection system automatically detects changes in the environment.

9. The system of claim 5 wherein further comprising means for manually setting the operating mode of the detection system.

10. The system of claim 5 wherein the operating modes of the detection system are changed by changing a characteristic of the system other than a chirp waveform.

11. The system of claim 5 wherein the operating modes of the detection system are changed by changing at least one of a plurality of different detection parameters.

12. The system of claim 5 wherein the detection system dynamically adjusts operating modes of the detection system in response to changes in an environment in which the detection system is being used.

13. A vehicle radar system disposed in a vehicle, the vehicle radar system comprising:
a detection system configured to:
  detect vehicles;
  operate in one of a plurality of detection modes,
wherein a particular detection mode in which to operate is selected based upon an environment surrounding the vehicle in which the vehicle radar system is disposed and at least a number of detected vehicles detected,
wherein the detection system comprises a chirp radar system and wherein the operating modes of the detection system are changed by adjusting a characteristic of a chirp waveform provided by the chirp radar system,
wherein the environment comprises one of a city environment or a highway environment,
wherein the detection system provides a first chirp waveform in the city environment and a second chirp waveform in a highway environment,
wherein the second chirp waveform has a shorter period than the first chirp signal.

* * * * *

UNITED STATES PATENT AND TRADEMARK OFFICE
CERTIFICATE OF CORRECTION

PATENT NO. : 7,400,290 B2
APPLICATION NO. : 11/324035
DATED : July 15, 2008
INVENTOR(S) : Woodington et al.

It is certified that error appears in the above-identified patent and that said Letters Patent is hereby corrected as shown below:

Col. 1, line 10, delete "application" and replace with -- Application --.

Col. 1, line 12, delete "application" and replace with -- Application --.

Col. 1, line 14, delete "application" and replace with -- Application --.

Col. 1, line 17, delete "application" and replace with -- Application --.

Col. 1, line 20, delete "application" and replace with -- Application --.

Col. 1, line 24, delete "application" and replace with -- Application --.

Col. 2, line 32, delete "rode," and replace with -- road --.

Col. 2, line 62, delete "the surrounding" and replace with -- surrounding --.

Col. 3, line 1, delete "rode" and replace with -- road, --.

Col. 3, line 25, delete "of" and replace with -- of the --.

Col. 5, line 23, delete "vehicle)." and replace with -- vehicle. --.

Col. 7, line 27, delete "signal" and replace with -- signals --.

Col. 8, line 17, delete "know" and replace with -- known --.

Col. 8, line 58, delete "down converted" and replace with -- down-converted --.

Col. 9, line 48, delete "register" and replace with -- registers --.

Col. 9, line 53-54, delete "waveform" and replace with -- waveforms --.

Col. 9, line 56, delete "register" and replace with -- registers --.

Col. 10, line 12, delete "199a-99h" and replace with -- 199a-199h --.

Col. 10, line 25, delete "have" and replace with -- having --.

Col. 10, line 34-35, delete "to a the digital to analog" and replace with -- to the digital-to-analog --.

Col. 10, line 54, delete "sample" and replace with -- samples --.

Col. 11, line 30, delete "waveform allows" and replace with -- waveforms allow --.

Col. 12, line 34, delete "started the" and replace with -- started, the --.

Col. 12, line 47, delete "DSP." and replace with -- DSP 104. --.

Col. 12, line 51, delete "the" and replace with -- The --.

Col. 12, line 62, delete "register" and replace with -- registers --.

Col. 12, line 66, delete "waveform" and replace with -- waveforms --.

Col. 13, line 4, delete "waveform" and replace with -- waveforms --.

CERTIFICATE OF CORRECTION (continued)
U.S. Pat. No. 7,400,290 B2

Col. 13, line 27, delete "heavy having" and replace with -- having heavy --.

Col. 13, line 52, delete "432a vehicle" and replace with -- vehicle 432a --.

Col. 14, line 14, delete "as well moving" and replace with -- as well as moving --.

Col. 14, line 29, delete "at a very" and replace with -- at very --.

Col. 14, line 53, delete "by the both" and replace with -- by both --.

Col. 14, line 60, delete "coupled" and replace with -- coupling --.

Col. 15, line 29, delete "vehicle" and replace with -- vehicles --.

Col. 16, line 6, delete "another" and replace with -- other --.

Col. 16, line 56, delete "in on or more or the" and replace with -- in one or more of the --.

Signed and Sealed this

Sixteenth Day of March, 2010

David J. Kappos
*Director of the United States Patent and Trademark Office*